(12) United States Patent
Shimogama et al.

(10) Patent No.: US 6,294,887 B1
(45) Date of Patent: Sep. 25, 2001

(54) MOTOR BRAKE DEVICE FOR A ROBOT

(75) Inventors: Shigeru Shimogama, Hyogo; Yasumichi Muto, Osaka, both of (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/549,430

(22) Filed: Apr. 14, 2000

(30) Foreign Application Priority Data

Apr. 15, 1999 (JP) .................................................. 11-107912

(51) Int. Cl.[7] .............................. H02K 23/68; H02P 3/00
(52) U.S. Cl. .......................... 318/362; 318/371; 318/372
(58) Field of Search ................................... 318/362, 371, 318/372, 757

(56) References Cited

U.S. PATENT DOCUMENTS 5,449,992 * 9/1995 Geiger et al. ......................... 318/362
5,552,686 * 9/1996 Schmid et al. ....................... 318/362

FOREIGN PATENT DOCUMENTS 5-66718    3/1993  (JP) .

* cited by examiner

*Primary Examiner*—Marlon T. Fletcher
(74) *Attorney, Agent, or Firm*—Pearne & Gordon LLP (57) ABSTRACT

A brake release circuit of an electromagnetic brake for locking a motor and an indication circuit for indicating a brake release are coupled together. Both the circuits may be turned on and off by a single switch contact. A motorbrake release device secures space saving and high safety, and is economical.

6 Claims, 6 Drawing Sheets

MOTOR BRAKE DEVICE FOR A ROBOT

BACKGROUND OF THE INVENTION

The present invention relates to a motor brake device for controlling the drive of a motor.

Figure 6:
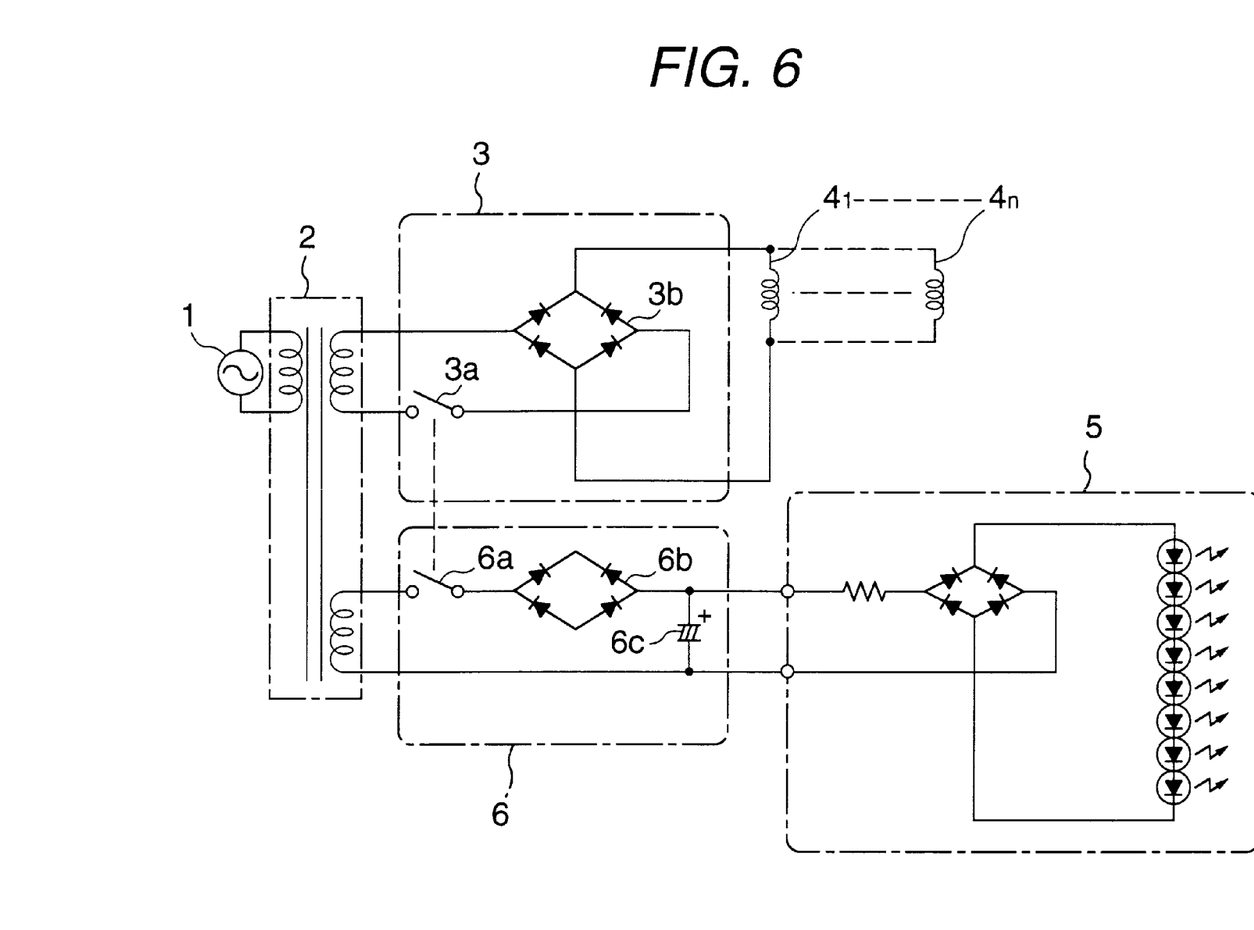
FIG. 6 is a circuit diagram showing a conventional motor brake device.

As shown in FIG. 6, a conventional motor brake device for controlling the drive of a motor uses a brake release power supply to an electromagnetic brake which locks a motor shaft. The brake release power supply is formed by full-wave rectifying an AC power souse received through an insulating transformer.

Also in a power supply to a motor-drive indicator section, a voltage received from the insulating transformer is full-wave rectified, and the rectified one is formed into a constant voltage source by use of a capacitor, and the constant voltage source is supplied to the indicator section.

Contacts to synchronously turn on and off those two circuits must be provided for those circuits, respectively, since voltages supplied thereto are different from each other.

An AC power source 1 of a single phase is connected to an input side of an insulating transformer 2. AC powers of different voltages are supplied from the insulating transformer 2 to a motor-brake power supple circuit 3 and an indicator power supply circuit 6.

In the a motor-brake power supply circuit 3, a motor-brake release switch contact 3a is closed as needed, and a single-phase AC power is full-wave rectified by a bridge diode circuit 3b, and the rectified voltage is supplied to brake coils $4_1$ to $4_n$ (n: number of existing coils) of an electromagnetic brake for locking the motor shaft, whereby the motor shaft is released from its locking state.

An indicator section 5 is provided for visually presenting a release of the motor brake to the operator.

The indicator power supply circuit 6 includes a switch contact 6a, which is operated synchronously with the motor-brake release switch contact 3a. When the switch contact 6a is closed, the single-phase AC power is full-wave rectified by a bridge diode circuit 6b, and the full-wave rectified power is further smoothed into a constant voltage by a capacitor 6c. The resultant constant voltage is applied to the indicator section 5, to thereby turn on the indicator section 5.

After seeing the lighting-on of the indicator section 5, the operator knows that the motor brake is released and the motor is in a driving state.

As described above, in the conventional motor brake device, the electric power is supplied, at different voltages, to the a motor-brake power supply circuit 3 and the indicator power supply circuit 6. For this reason, those power supply circuits are separately provided. Those circuits, respectively, include switch contacts for turning on and off the insulating transformer 2 (mainly used for voltage decreasing) and the bridge diode circuits 3b and 6b for full-wave rectifying. For this reason, the weight and size reduction is impossible.

In a trouble of poor contact in the switch contacts for synchronously turning on and off the power supply circuits, if one of the switch contacts is inoperative, an indication of the indicator section mismatches a driving state of the motor. As a result, the operator will be placed in a dangerous state.

SUMMARY OF THE INVENTION

Accordingly, the present invention has an object to provide a motor brake device which succeeds in achieving the weight and size reduction, and eliminating the mismatching between the indication of the indicator section and the driving state of the motor.

The first aspect of the invention provides a motor brake device for a robot which includes a motor brake power supply section. The input of the motor brake power supply section is connected to a power source, and the output thereof is connected to the coils of an electromagnetic brake. In the motor brake power supply, a rectifying element is inserted between a first end of the input and a first end of the output, and an opening/closing element is inserted between a second end of the input and a second end of the output.

According to the first aspect of the invention, a rectified AC power source by a rectifying element is used as a power supply of an electromagnetic brake, and it is turned on and off by a motor brake release switch contact. Therefore, the motor brake device is superior to the conventional one in space saving and is more economical than the latter.

The second aspect of the invention provides a motor brake device for a robot includes a motor brake power supply section, an indicator section, a first resistor, a second rectifying element, a second resistor, and a capacitor. The input of the motor brake power supply section is connected to a power source, and an output thereof is connected to coils of an electromagnetic brake. In the motor brake power supply section, a first rectifying element is inserted between a first end of the input and a first end of the output, and an opening/closing element is inserted between a second end of the input and a second end of the output. A first end of the first resistor is connected to a first end of the output of the motor brake power supply section, a second end of the first resistor is connected to a first end of a second rectifying element, a second end of the second rectifying element is connected a first end of a second resistor, a second end of the second resistor is connected to a second end of the output of the motor brake power supply section, a capacitor is connected in parallel with the second resistor, and both ends of the capacitor are connected to the input of an indicator section.

With such an arrangement, a divided voltage may be applied to the indicator section. Accordingly, a power supply of the motor brake power supply section may be used for the indicator section. In other words, power of both the driving of the electromagnetic brake and the indicator section is provided from a single power supply. Therefore, there is no need of the insulating transformer and the bridge diode circuit, which are essential to the conventional device. Space saving is secured, and the device is economical.

Further, the electromagnetic brake and the indicator section are synchronously turned on and off by use of a switch contact. Accordingly, the present invention eliminates the mismatching between the indication of the indicator section and the driving state of the motor in a trouble of poor contact in the switch contacts in the motor brake power supply section or the indicator power supply section. Thus, a motor-brake releasing state always matches an indication by the indicator section, to thereby securing a safety of the operator.

A third aspect of the invention define the second motor brake device such that a third rectifying element is inserted between the second end of the second resistor and the second end of the output of the motor brake power supply section.

According to the third aspect of the invention, the indicator power supply section and the indicator section can be protected against spike noise that is caused by a counter electromotive force generated in the electromagnetic brake.

The rectifying element inserted does not function as a flywheel diode (damper diode) for the line of the coil of the electromagnetic brake. It is independent of a time taken for the electromagnetic brake to operate, thereby ensuring a safe operation.

A fourth aspect of the invention defines a constant voltage element is connected in parallel with the capacitor, and a voltage output value of the constant voltage element is lower than the withstanding voltage value of the capacitor but higher than a drive voltage of the indicator section.

According to the forth aspect of the invention, when the indicator section is exchanged with another in maintenance work, current is fed to the motor brake device in a state that the connector is opened, or when a harness connecting to the connector is disconnected, the output voltage is equal to the output voltage value of the constant voltage element, and hence can be set at a voltage value below the withstanding voltage of the capacitor. As a result, the capacitor is not broken and the indicator power supply section stably maintains its function.

A fifth aspect of the invention defines the motor brake devices according to any of the second to forth aspect of the invention, such that a charge of the capacitor is 12×10EXP (−3) (coulomb) or smaller.

According to the fifth aspect of invention, the capacitance C of the capacitor is set at 470 $\mu$F so that Q (charge of the capacitor)=C·V<12×10 EXP(−3) (coulomb). Accordingly, the delay time which allows the operator to recognize or allows that the ON and OFF operations of the electromagnetic brake locking the motor are represented by or match the operations of turning on and off the indicator section 5, may be set within 0.5 second.

DETAILED DESCRIPTION OF THE PREFERRED EMBODIMENTS (First Embodiment)

Figure 1:
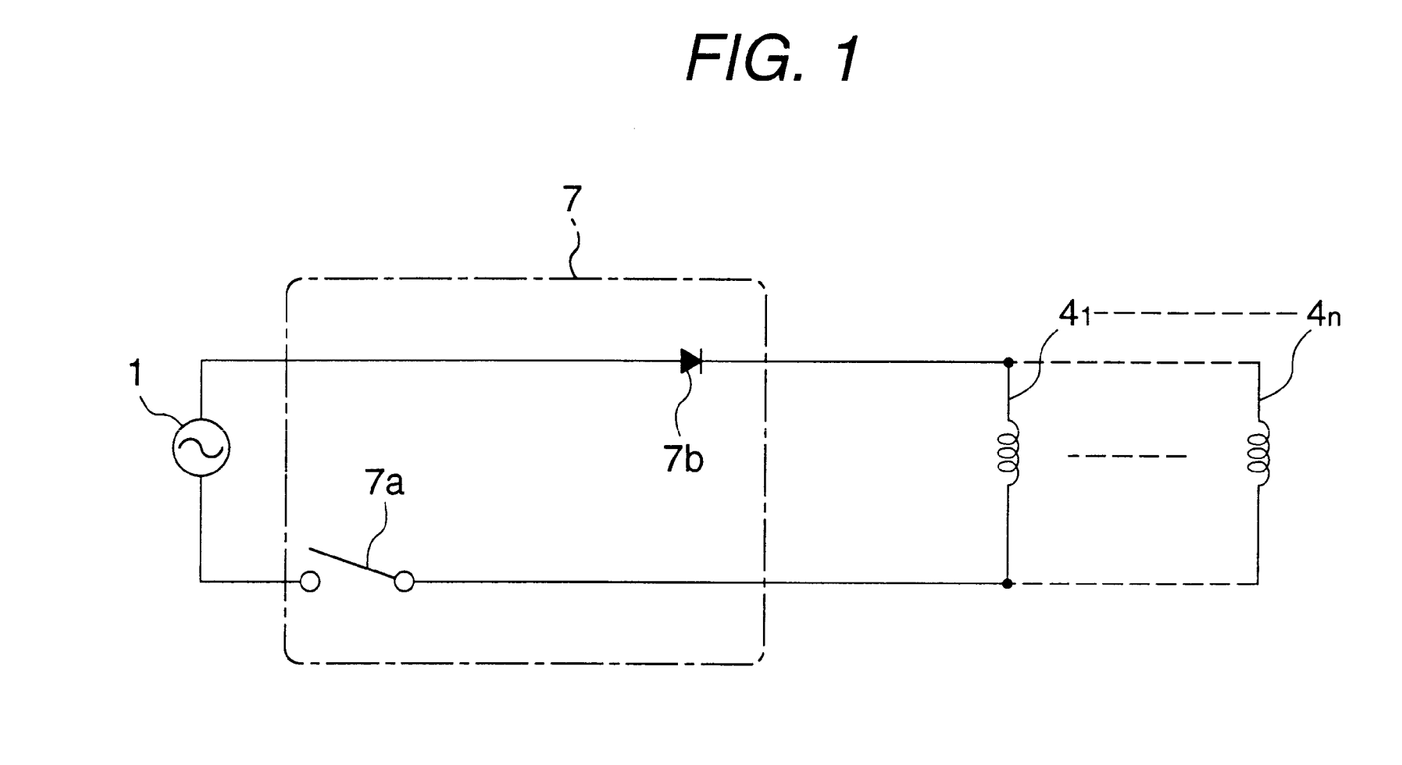
FIG. 1 is a circuit diagram showing first embodiment of the present invention.

The preferred embodiments of the present invention will be described in detail with reference to FIGS. 1 through 5. FIG. 1 shows a motor brake device of the first embodiment of the invention for a robot which contains a single-phase half-wave rectifying circuit for it power supply circuit In a motor-brake power supply circuit 7, a motor-brake release switch contact 7a as a switching element is closed as needed, so that an AC power is half-wave rectified by a diode 7b as a rectifying element, and the half-wave rectified power is supplied to brake coils $4_1$ to $4_n$ (n number of existing coils) of an electromagnetic brake for locking the motor shaft, to thereby release the motor shaft from its locking.

(Second Embodiment)

Figure 2:
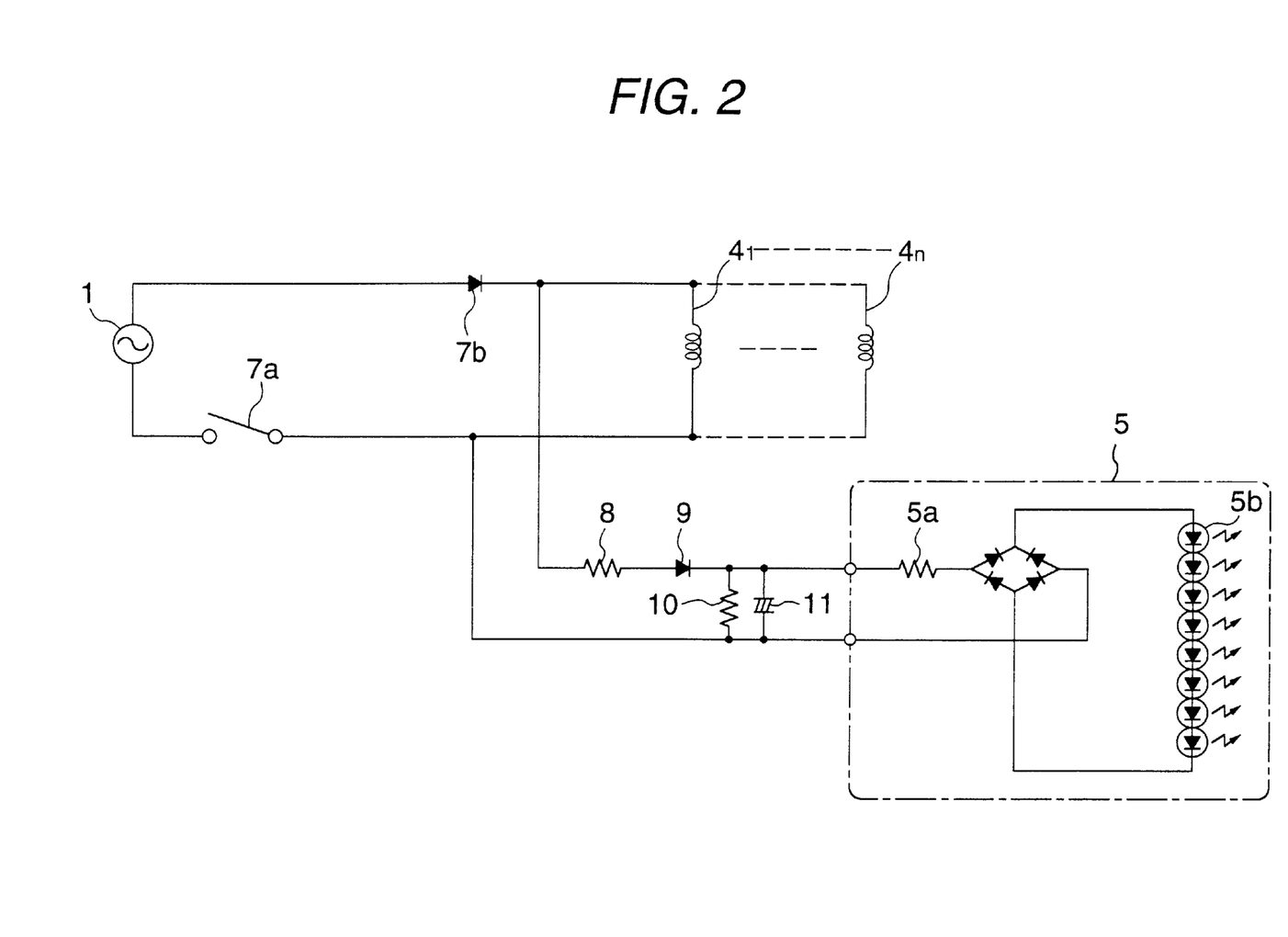
FIG. 2 is a circuit diagram showing second embodiment of the present invention.

FIG. 2 shows a motor brake device for a robot including an indicator section of the second embodiment of the invention.

As shown in FIG. 2, the motor brake device of the second embodiment of the invention is provided a motor drive indicating circuit connected to the line of half-wave rectified power supply and in parallel with coils $4_1$~$4_n$.

While the cathode of the diode 7b is set at the positive polarity, a series circuit consisting of a first resistor 8, a diode 9 as a second rectifying element, and a second resistor 10 is connected in parallel with the brake coils $4_1$ to $4_n$.

The half-wave rectified voltage is divided by the first resistor 8, the second resistor 10 and a resistor 5a of the indicator section 5 in order that the indicator section 5 has a necessary voltage. A constant voltage capacitor 11 generates a constant voltage from the divided voltage, and the constang voltage is applied to the indicator section 5.

The diode 9 blocks an influence by the constant voltage circuit upon the line of the half-wave rectified power supply.

With this circuit arrangement, when the motor-brake release switch contact 7a is closed, the indicator section 5 is turned on synchronously.

Thus, the power supplying operation to the electromagnetic brake coils $4_1$ to $4_n$ of the motor brake and the indicator section 5 are both controlled through only the opening/closing operation of the motor-brake release switch contact 7a. Further, the ON/OFF state of the brake coils $4_1$ to $4_n$ are always synchronized with the ON/OFF state of the indicator section 5.

(Third Embodiment)

Third embodiment of the invention will be described with reference to FIG. 3. A motor brake device of this embodiment is capable of protecting the indicator section against spike noise (counter electromotive force) which is generated by the coils of the electromagnetic brake when the power supply to the electromagnetic brake is shut off.

When the motor-brake release switch contact 7a changes its state from a closing state to an open state, the brake coils $4_1$ to $4_n$ generate counter electromotive forces appeared on the ground wire of the line of the half-wave rectified power supply.

A negative voltage value is two times as large as a crest value of the voltage produced by the half-wave rectification.

When the negative voltage is repetitively applied, the constant voltage capacitor 11 and a LED indicator 5b of the indicator section 5 will be destroyed.

A general approach to absorb the negative voltage (surge voltage) is to connect a diode which is connected at the cathode to the positive polarity side of the motor-brake power supply section and at the anode to the ground. In other words, a diode is connected in parallel with the brake coils $4_1$ to $4_n$, whereby it is operated as a fly-wheel diode (damper diode) In this approach, time of several hundreds millisecond is taken till the brake coils $4_1$ to $4_n$ are perfectly de-energized. This is seriously problematic when the motor must be emergently stopped. In a case where the mechanical portion incorporated into the motor will move in the gravity direction, the mechanical potion free falls for the time of several hundreds milliseconds.

Figure 3:
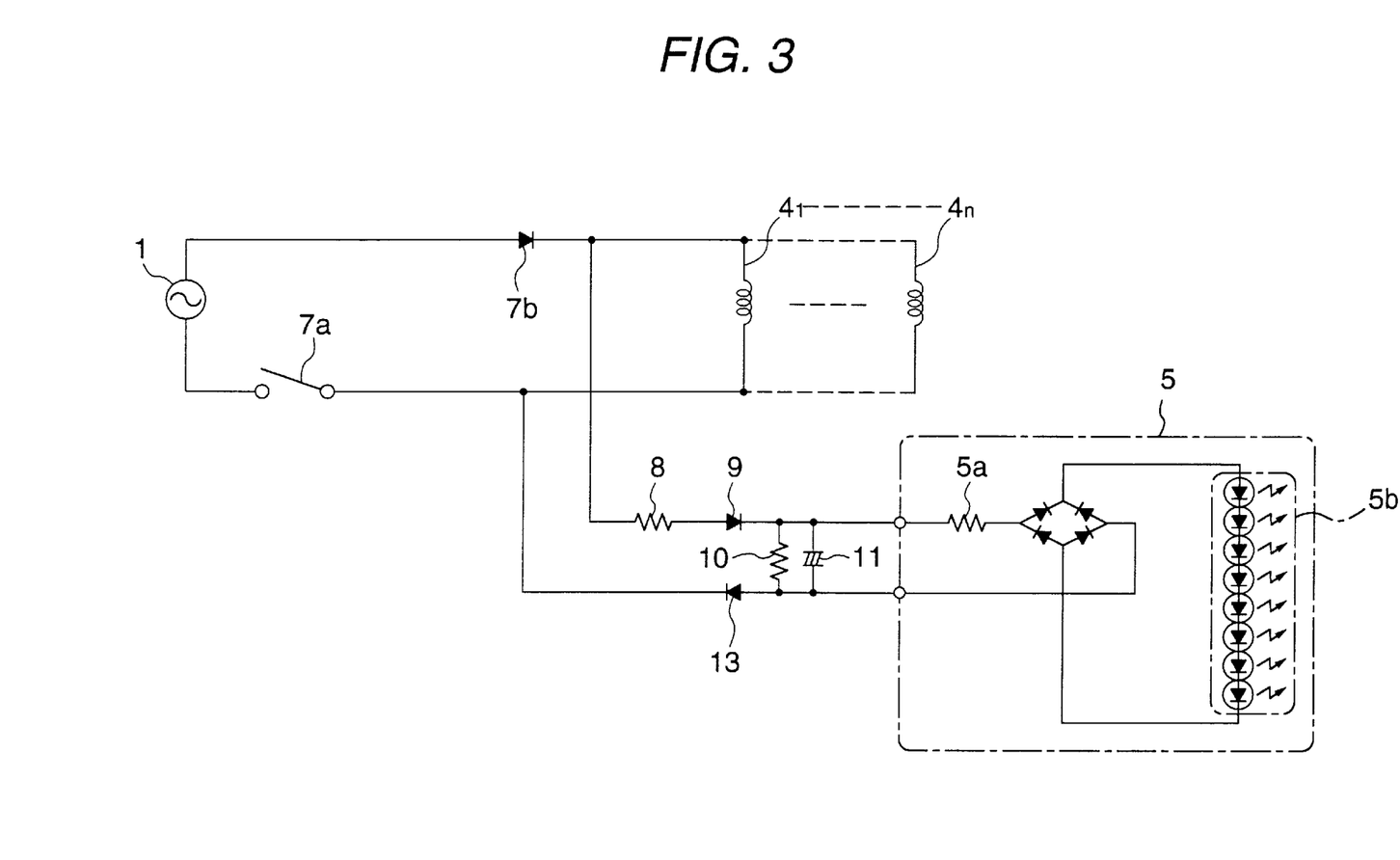
FIG. 3 is a circuit diagram showing third embodiment of the present invention.

To cope with this, in the second embodiment of the invention, as shown in FIG. 3, a diode 13 as a third rectifying element is connected at the anode to the ground wire of the power line through which the power is supplied to the indicator section 5, and at the cathode to the ground wire of the power line connecting to the power source by the half-wave rectification. With use of the diode 13, the constant voltage capacitor 11 and the LED indicator 5b of the indicator section 5 can be protected against the negative voltage (surge voltage) which appears on the ground side of the power line connecting to the half-wave rectified power supply, and which is generated by the brake coils $4_1$ to $4_n$ when the power supply is shut off.

(Fourth Embodiment)

Figure 4:
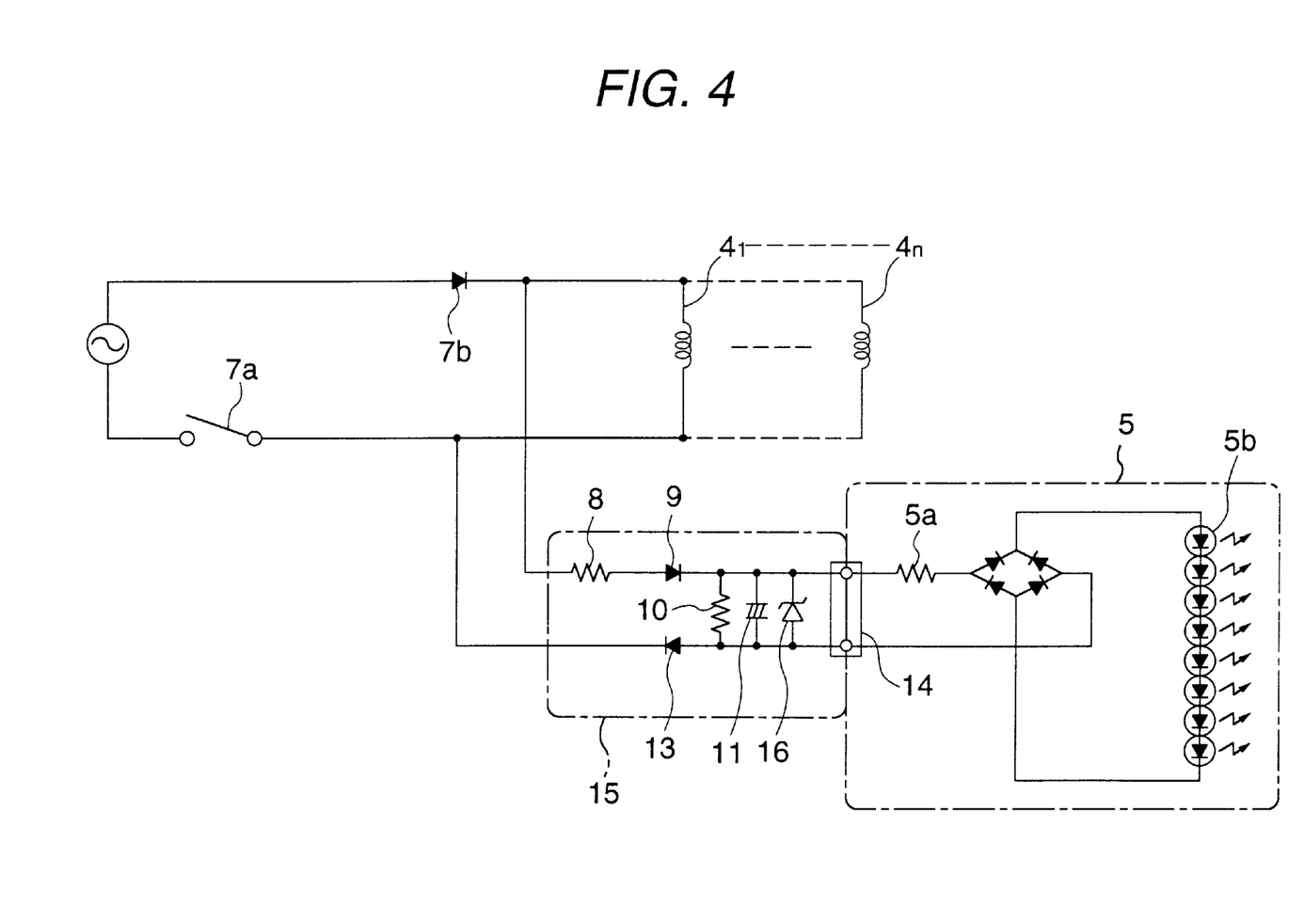
FIG. 4 is a circuit diagram showing forth embodiment of the present invention.

A motor brake device for a robot of the fourth embodiment of the invention will be described with reference to FIG. 4. In the motor brake device, the constant voltage section includes a Zener diode which is connected at the cathode to the positive polarity of the capacitor of the constant voltage power line, and at the anode to the negative polarity of the capacitor 11. A Zener voltage value of the Zener diode is selected to be lower than the withstanding voltage value of the constant-voltage capacitor and higher than a voltage required for the indicator section.

The withstanding voltage value of the constant voltage capacitor 11 is selected to be somewhat higher than the voltage value required for the indicator section to secure space saving and from an economical standpoint.

The indicator section 5 is a commercially available unit, and is connected to an indicator power supply section 15 by use of a connector 14.

When the indicator section 5 is exchanged with another in maintenance work, current is fed to the motor brake device in a state that the connector 14 is opened, or when a harness connecting to the connector 14 is disconnected by some cause during the current feeding, the device circuit is put in a state that the resistor 5a is disconnected from the circuit. In this state, the voltage of the power source by the half-wave rectification is divided by only the resistors 8 and 10, so that the divided voltage across the resistor 10 is much higher than the voltage when the indicator section 5 is normally connected to the device circuit.

As a result, the voltage exceeds the withstanding voltage of the constant voltage capacitor 11, and the capacitor 11 will be destroyed. In this embodiment, the Zener diode 16 as a constant voltage element, which has a Zener voltage value lower than the withstanding voltage value of the constant-voltage capacitor and higher than a voltage required for the indicator section, is connected in parallel with the capacitor 11 as shown in FIG. 4. Accordingly, the voltage across the capacitor can be set at a voltage value below the withstanding voltage of the capacitor. As a result, the capacitor is not broken and the indicator power supply section 15 stably maintains its function.

(Fifth Embodiment)

Fifth embodiment of the invention will be described with reference to FIGS. 5.

When the motor-brake release switch contact 7a changes its state from a close state to an open state, charge Q stored in the capacitor 11 in the indicator power supply section 15 is discharged through the resistors 10 and 5a. Here, Q=C·V (Q: charge (coulomb), C: capacitance (farad), V: voltage across the capacitor (volt)).

Because of the discharging operation, time difference is created between the ON and OFF operations of the electromagnetic brake that locks the motor and the operations of turning on and off the indicator section 5. In the relation Q=C·V, the voltage V is set at a fixed value since it is determined by the required input voltage of the indicator section 5.

Thus, the delay time is determined by a capacitance of the capacitor 11.

Figure 5:
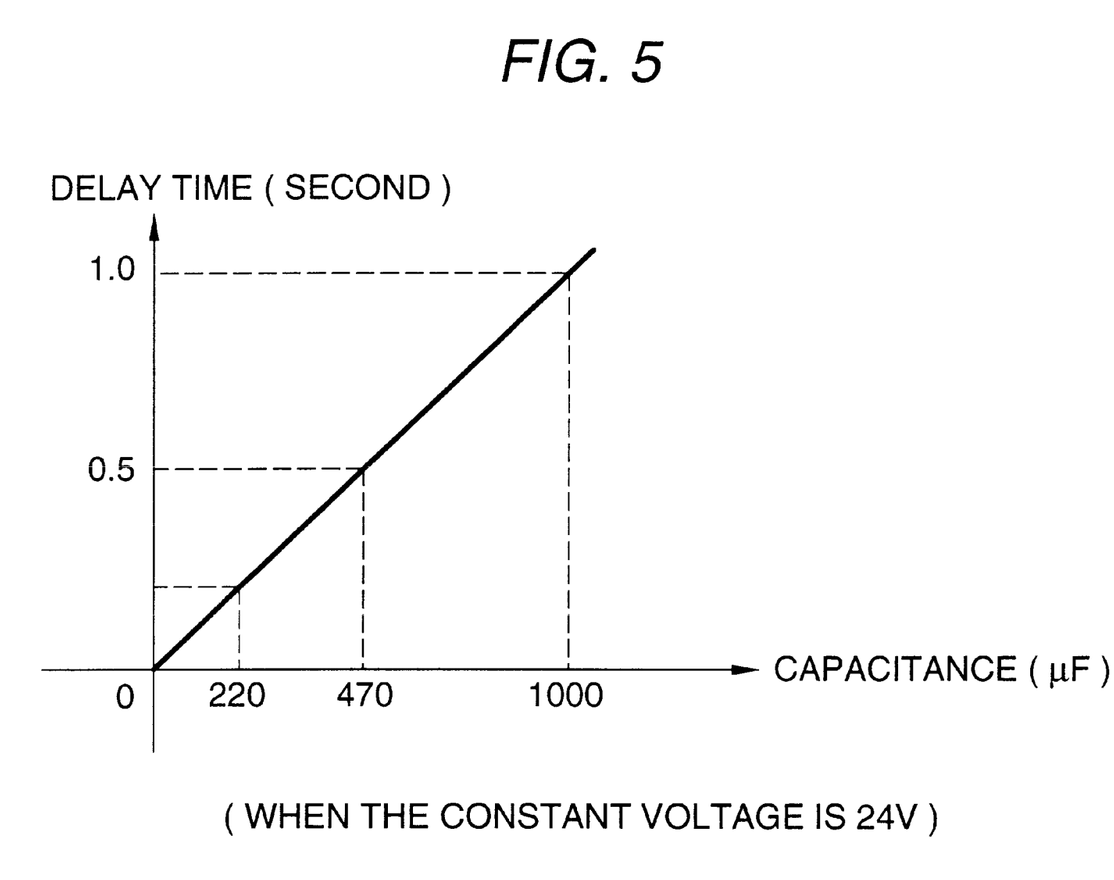
FIG. 5 is a graphical representation of showing a delay time between an electromagnetic brake releasing device and a motor-drive indicator section.

FIG. 5 is a graph showing a variation of the delay time with respect to the capacitance of the capacitor 11 when the voltage V is fixed at 24V.

The delay time which allows the operator to recognize or allows that the ON and OFF operations of the electromagnetic brake locking the motor are represented by or match the operations of turning on and off the indicator section 5, is within 0.5 second.

The larger the capacitance of the capacitor, the better it is because it is desirable that a less ripple is contained in the rectified voltage.

In the invention, the capacitance C of the capacitor 11 is 470 $\mu$F.

Accordingly, the charge of the constant-voltage capacitor used in the constant voltage section is 12×10 EXP(−3) (coulomb) or smaller.

As seen from the foregoing description, in the first embodiment of the invention, a AC power source is rectified by a rectifying element, and used as a power supply of an electromagnetic brake, and it is turned on and off by a motor brake release switch contact. Therefore, the motor brake device is superior to the conventional one in space saving and is more economical than the latter.

In the motor brake device of the second embodiment of invention, a first end of a first resistor is connected to a first end of the output of the motor brake power supply section, a second end of the first resistor is connected to a first end of a second rectifying element, a second end of the second rectifying element is connected a first end of a second resistor, a second end of the second resistor is connected to a second end of the output of the motor brake power supply section 7, a capacitor is connected in parallel with the second resistor, and both ends of the capacitor are connected to the input of an indicator section. With such an arrangement, a divided voltage may be applied to the indicator section. Accordingly, a power of the motor brake power supply section may be used for the indicator section. In other words, sue of a single power source will do for both the driving of the electromagnetic brake and the indicator section. Therefore, there is no need of the insulating transformer and the bridge diode circuit, which are essential to the conventional device. Space saving is secured, and the device is economical.

The electromagnetic brake and the indicator section are synchronously turned on and off by use of a switch contact. Accordingly, the present invention eliminates the mismatching between the indication of the indicator section and the driving state of the motor in a trouble of poor contact in the switch contacts in the motor brake power supply section or the indicator power supply section. Thus, a motor-brake releasing state always matches an indication by the indicator section, to thereby securing a safety of the operator.

In the third embodiment, a third rectifying element is inserted between the second end of the second resistor and the second end of the output of the motor brake power supply section . Therefore, the indicator power supply section and the indicator section can be protected against spike noise that is caused by a counter electromotive force generated in the electromagnetic brake.

The rectifying element inserted does not function as a flywheel diode (damper diode) for the line to the electromagnetic brake coil. It is independent of a time taken for the electromagnetic brake to operate, thereby ensuring a safe operation.

In the fourth embodiment, a constant voltage element is connected across the capacitor, and a voltage output value of the constant voltage element is lower than the withstanding voltage value of the capacitor but higher than a drive voltage of the indicator section. When the indicator section is exchanged with another in maintenance work, current is fed to the motor brake device in a state that the connector is opened, or when a harness connecting to the connector is disconnected, the output voltage is equal to the output voltage value of the constant voltage element, and hence can be set at a voltage value below the withstanding voltage of the capacitor. As a result, the capacitor is not broken and the indicator power supply section stably maintains its function.

In the fifth invention, the capacitance C of the capacitor 11 is set at 470 $\mu$F. so that Q (charge of the capacitor)=C·V <12×10 EXP(−3) (coulomb) . Accordingly, the delay time which allows the operator to recognize or allows that the ON and OFF operations of the electromagnetic brake locking the motor are represented by or match the operations of turning on and off the indicator section 5, may be set within 0.5 second.

What is claimed is:

1. A motor brake device comprising:

a power source;

at least one brake coil of an electromagnetic brake; and a motor brake power supply section which is connected between the power source and the electromagnetic brake coil, which includes:

a rectifying element connected between a first end of the power source and a first end of the coil;

a switch connected between a second end of the power source and the second end of the coil;

a motor brake power supply section with an indicator power supply section which includes:

at least a voltage dividing element which divides the rectified voltage of the motor brake power supply; and at least a constant voltage element which generates the constant voltage from the divided voltage of the voltage dividing element, and a indicator section which indicates the driving states of the motor based on the output of the motor brake power supply section.

2. The motor brake device according to claim 1, wherein the indicator power supply section further comprises a third rectifying element connected between the second end of the second resistor and the second end of output of the motor brake power supply section.

3. The motor brake device according to claim 1, wherein the indicator power supply section further comprises a constant voltage element in parallel with the capacitor, wherein the constant voltage element provides the voltage output value which is lower than the withstanding voltage of the capacitor, and higher than a drive voltage of said indicator section.

4. The motor brake device according to claim 1, wherein a charge of the capacitor is 12×10 EXP(−3) (coulomb) or smaller.

5. a motor brake device comprising:

a power source;

at least a coil of an electromagnetic brake;

a motor brake power supply section which is connected between the power source and the coil of electromagnetic brake, which includes:

a first rectifying element connected between a first end of the power source and a first end of the coil of the electromagnetic brake; and a switch connected between a second end of the power source and a second end of the motor brake power supply section;

an indicator power supply section connected between the coil of the electromagnetic brake and the motor brake power supply section and connected in parallel with the coil, which includes:

a first resistor, wherein the first end of a first resistor is connected a first end to the motor brake power supply section;

a second rectifying element, wherein a first end of the second rectifying element is connected to a second end of the first resistor;

a second resistor connected between a second end of the second rectifying element and the second end of the motor brake power supply section; and a capacitor connected in parallel with the second resistor; and an indicator section, which is connected in parallel with the capacitor of the indicator power supply section.

6. The motor brake device according to claim 5, wherein the indicator power supply section further comprises a constant voltage element in parallel with the capacitor, wherein the constant voltage element provides the voltage output value which is lower than the withstanding voltage of the capacitor, and higher than a drive voltage of said indicator section.

* * * * *

UNITED STATES PATENT AND TRADEMARK OFFICE
CERTIFICATE OF CORRECTION

PATENT NO.    : 6,294,887 B1  
DATED         : September 25, 2001  
INVENTOR(S)   : Shigeru Shinogama et al.

Page 1 of 1

It is certified that error appears in the above-identified patent and that said Letters Patent is hereby corrected as shown below:

Drawings,
Figure 6 should be labeled as -- PRIOR ART -- as indicated in the examiner's amendment of May 7, 2001.

Column 1,
After line 20, please insert the following paragraph
-- A conventional motor brake device is shown in Fig. 6. --; and Column 7,
Line 6, please delete "470 $\mu$F." and insert therefor -- 470 $\mu$F --.

Signed and Sealed this

Twenty-third Day of April, 2002

Attest:

Attesting Officer

JAMES E. ROGAN  
Director of the United States Patent and Trademark Office